US008912948B1

(12) United States Patent
Friesel

(10) Patent No.: US 8,912,948 B1
(45) Date of Patent: Dec. 16, 2014

(54) SYSTEM AND METHOD FOR CUED ACQUISITION AZIMUTH AND ELEVATION EXTENT CALCULATION USING PERSPECTIVE PROJECTION

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 373 days.

(21) Appl. No.: 13/361,424

(22) Filed: Jan. 30, 2012

(51) Int. Cl.
*G01S 13/72* (2006.01)
*G01S 7/295* (2006.01)

(52) U.S. Cl.
CPC *G01S 7/295* (2013.01); *G01S 13/72* (2013.01)
USPC .............................................. 342/95; 342/73

(58) Field of Classification Search
CPC ................................. G01S 7/295; G01S 13/72
USPC ...................................................... 342/95, 96
See application file for complete search history.

(56) References Cited

U.S. PATENT DOCUMENTS

| 4,467,447 | A | 8/1984 | Takahashi et al. |
| 5,890,012 | A | 3/1999 | Poisner |
| 6,297,763 | B1 | 10/2001 | Thomson et al. |
| 7,184,036 | B2 | 2/2007 | Dimsdale et al. |
| 7,221,307 | B1 | 5/2007 | Friesel |
| 7,330,151 | B1 | 2/2008 | Monk et al. |
| 8,044,841 | B1 | 10/2011 | Boardman et al. |
| 8,115,148 | B1 | 2/2012 | Boardman et al. |
| 8,134,492 | B1 | 3/2012 | Friesel |
| 8,149,161 | B1 | 4/2012 | Friesel |
| 8,184,041 | B1 | 5/2012 | Friesel |
| 8,223,065 | B1 * | 7/2012 | Friesel ............................ 342/95 |
| 8,253,621 | B1 * | 8/2012 | Friesel ............................ 342/95 |
| 8,427,364 | B1 * | 4/2013 | Friesel ............................ 342/95 |
| 2006/0202886 | A1 | 9/2006 | Mahapatra et al. |
| 2007/0018882 | A1 | 1/2007 | Manoogian et al. |
| 2008/0153414 | A1 | 6/2008 | Ho et al. |
| 2008/0210016 | A1 | 9/2008 | Zwirn et al. |
| 2009/0262524 | A1 | 10/2009 | Chen |
| 2010/0282894 | A1 | 11/2010 | Guertin et al. |
| 2011/0288686 | A1 | 11/2011 | Wang |

OTHER PUBLICATIONS

U.S. Appl. No. 12/879,374, filed Sep. 10, 2010, entitled "Method and System for Scanning a Radar Search Volume and Correcting for 3D Orientation of Covariance Ellipsoid".
Eberly, D., "Perspective Projection of an Ellipsoid", Geometric Tools, LLC, http://www.geometrictools.com, Created: Mar. 2, 1999, last Modified: Mar. 1, 2008.

* cited by examiner

*Primary Examiner* — Matthew M Barker
(74) *Attorney, Agent, or Firm* — Howard IP Law Group, PC

(57) ABSTRACT

Methods are disclosed for obtaining a cued radar acquisition volume. The method employs uncertainties (i.e., errors) represented by a covariance, and a method of finding the minimum volume defined by range, azimuth, and elevation limits that enclose the covariance, and uses a perspective projection of the errors to provide an accurate calculation of the cued acquisition volume. The three-dimensional problem is first reduced to two dimensions by parallel projection onto the range-transverse and range-elevation planes. Then perspective projection of the two dimensional parallel projections is performed. The disclosed method reduces the complexity of three dimensional perspective projection by preceding perspective projection with parallel projection, which greatly simplifies the problem and allows a simple and easily calculated solution.

14 Claims, 8 Drawing Sheets

SYSTEM AND METHOD FOR CUED ACQUISITION AZIMUTH AND ELEVATION EXTENT CALCULATION USING PERSPECTIVE PROJECTION

FIELD OF THE INVENTION

The invention relates to systems and methods for developing cued acquisition search volumes for radar systems in general, and more particularly to a system and method for developing azimuth and elevation extents for use in generating cued acquisition volumes in beam forming radar systems.

BACKGROUND OF THE INVENTION

Naval radar systems search space using a plurality of sequential directional beams which may be pointed in a given direction. In general, an acquisition face to be searched is defined, and radar beams are directed to cover the entire face. This type of searching is subject to time constraints, as the beam must dwell at a particular beam angle long enough for the transmitted radar signals or pulses to travel to the target and for the reflection to return to the radar.

When another source such as a cooperating radar develops information about the possible presence of a target in a given direction or location, it may be desired to examine a volume about the nominal given direction in an attempt to acquire the target. This is referred to as a "cued" search. If the selected volume is too large, the search may time-out before completion. But if the selected volume is too small, the target might not be found.

In general, methods are known for searching a search volume about a given cued direction and with a given maximum search range. The search of a designated volume is, as noted, performed with sequentially generated radar beams. Such methods may involve acquiring the nominal track position and velocity (i.e., cue information) and time, as well as error information describing the uncertainty in the cue information. Error may be represented by a covariance, and may be presented together with the cue information, and from this information, azimuth and elevation extents (the acquisition or search face) of the search volume are determined.

Given that searching is subject to time constraints, as noted above, it is desirable to provide the most accurate practical calculation of the cued acquisition volume possible, while minimizing the computational complexity of the process. Thus, there is a need for a computationally simple technique for providing a best possible estimate of an acquisition search volume. Such a technique should minimize the total time require to search a volume while maximizing the likelihood that the volume contains the target object.

SUMMARY OF THE INVENTION

As noted, cued acquisition techniques require that a search volume be created, where the search volume is defined by azimuth and elevation centers and extents, as well as range extents. The volume encloses a reported threat location consisting of a state vector defined by a nominal position and velocity of the target object, as well as uncertainties in the form of a covariance.

Given the uncertainties (i.e., errors) represented by the covariance, and a method of finding the minimum volume defined by range, azimuth, and elevation limits that enclose the covariance, a perspective projection of the errors is considered to allow the most accurate calculation of the cued acquisition volume. The three-dimensional problem is first reduced to two dimensions by parallel projection onto the range-transverse and range-elevation planes. Using the generic tangent formula for a conic section, the equation for the line containing the point of tangency and the coordinate origin is solved simultaneously with the ellipse equation to specify the point of tangency. The inverse tangent of the ratio of coordinates then gives the extents. Other approximation techniques have previously been used, including a method based upon circular triangles, a simpler version of the circular triangles method, and by parallel projection.

Perspective projection, while recognized as being the best technique for determining cued acquisition volumes, has been avoided because of perceived calculational complexity. The disclosed method reduces this complexity by preceding perspective projection with parallel projection, which greatly simplifies the problem and allows a simple and easily calculated solution.

A method is disclosed for generating a radar search volume enclosing a tracked target. The method may comprise: parallel projecting a three-dimensional covariance of the tracked target onto a range-transverse plane and a range-elevation plane to obtain two-dimensional covariances; determining an average elevation extent and average azimuth extent by perspective projecting the two-dimensional covariances; and generating the search volume using the average elevation extent and the average azimuth extent. The step of determining an average elevation extent and average azimuth extent by perspective projecting the two-dimensional covariances may comprise: generating an error ellipse corresponding to each of the two-dimensional covariances; determining a point of tangency on each of the error ellipses; determining maximum elevation and transverse extents of the search volume using the points of tangency; and determining an average elevation extent and an average azimuth extent from the maximum elevation and transverse extents. The step of determining a point of tangency on each of the error ellipses may comprise: using a tangent formula for a geometric figure and simultaneously solving, for each error ellipse, an equation for a line containing the point of tangency and a coordinate origin, and an equation for the error ellipse containing the point of tangency. The step of determining maximum elevation and transverse extents of the search volume from the points of tangency may also comprise determining maximum elevation and transverse extents of the search volume using the inverse tangent of a ratio of the coordinates of the points of tangency. The method may also comprise determining an elevation center for an acquisition face of the search volume based on the average elevation extent and a nominal elevation of the target and determining an azimuth center for the acquisition face of the search volume based on the average azimuth extent and a nominal azimuth of the target.

The method may further comprise receiving tracking data relating to the tracked target from a remote radar system. The step of receiving tracking data may comprise transforming the tracking data received from the remote radar system into coordinates of a local radar system generating the radar search volume, prior to parallel projecting of the three-dimensional covariance of the tracked target.

A radar system is disclosed for generating a radar search volume enclosing a tracked target. The radar system may comprise: a command and decision unit for parallel projecting a three-dimensional covariance of the tracked target onto a range-transverse plane and a range-elevation plane to obtain two-dimensional covariances; determining an average elevation extent and average azimuth extent by perspective projecting the two-dimensional covariances; and a radar beam controller operative for generating the search volume using the average elevation extent and the average azimuth extent. The command and decision unit determining an average elevation extent and average azimuth extent by perspective projecting the two-dimensional covariances may comprise: generating an error ellipse corresponding to each of the two-dimensional covariances; determining a point of tangency on each of the error ellipses; determining maximum elevation and transverse extents of a search volume using the points of tangency; and determining an average elevation extent and an average azimuth extent from the maximum elevation and transverse extents. The command and decision unit determining maximum elevation and transverse extents of the search volume using the points of tangency may comprise the command and decision unit determining maximum elevation and transverse extents of the search volume using the inverse tangent of a ratio of the coordinates of the points of tangency. The command and decision unit determining a point of tangency on each of the error ellipses may comprise using a tangent formula for a geometric figure and simultaneously solving, for each error ellipse, an equation for a line containing the point of tangency and a coordinate origin, and an equation for the error ellipse containing the point of tangency. The command and decision unit may also dete mine an elevation center for an acquisition face of the search volume based on the average elevation extent and a nominal elevation of the target and determining an azimuth center for the acquisition face of the search volume based on the average azimuth extent and a nominal azimuth of the target.

The radar system may further comprise a communications unit for receiving tracking data relating to the tracked target from a remote radar system. The command and decision unit may transform the tracking data received from the remote radar system into coordinates of the radar system, prior to parallel projecting of the three-dimensional covariance of the tracked target.

BRIEF DESCRIPTION OF TEE DRAWINGS

The details of the invention, both as to its structure and operation, may be obtained by a review of the accompanying drawings, in which like reference numerals refer to like parts, and in which.

DETAILED DESCRIPTION

Figure 1:
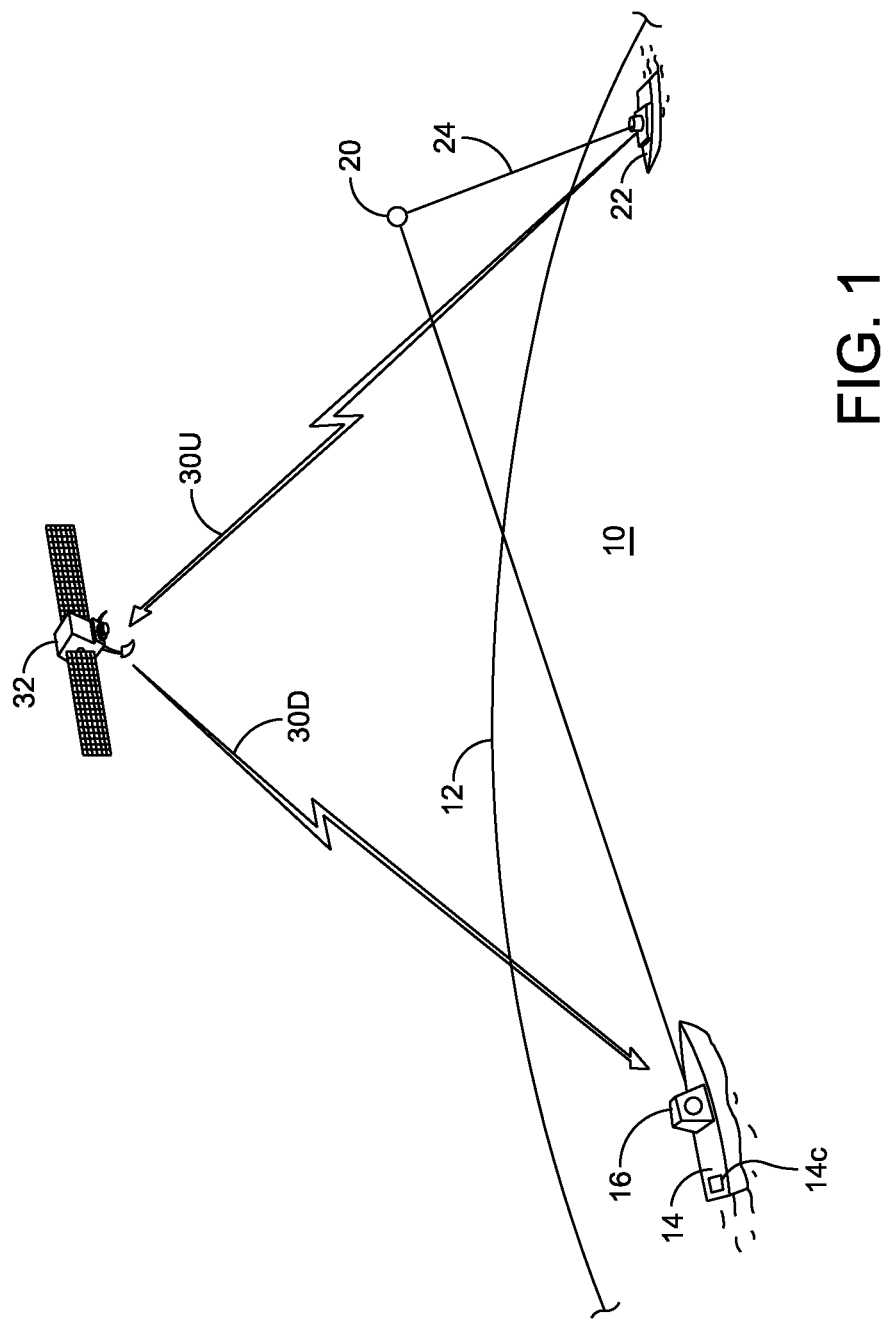
FIG. 1 is a representation of a radar system-equipped ship receiving cued information relating to a target from a remote radar system.

FIG. 1 shows a first ship 14 carrying a radar system 16 or other sensor system, and a computer processor 14c. A target 20 is located at a distance from the first ship 14, and is observed along a line-of-sight 24 by a radar system or other sensor system on a second ship 22. The second ship 22 obtains information about the location of the target 20. Since the first ship 14 may not be aware of the presence of the target 20, the second ship 22 transmits coordinates of the target to the first ship 14.

Figure 2:
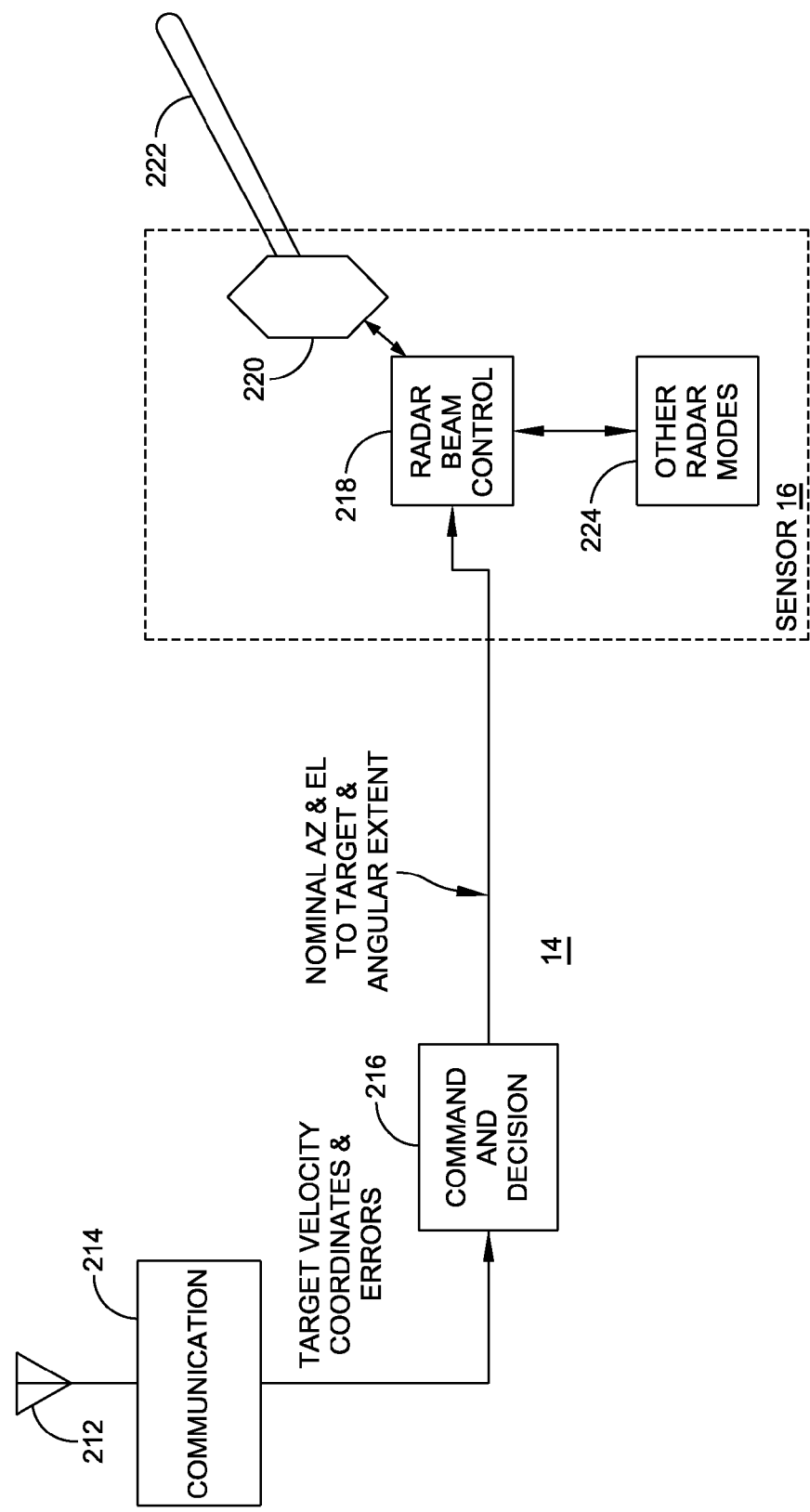
FIG. 2 is a simplified block diagram illustrating various shipboard functions relating to radar acquisition of the target of FIG. 1.

In FIG. 2, the first ship 14 includes a communications antenna 212 and communications unit 214 for communicating with other assets, including the communication represented in FIG. 1 by path 30U-30D. This communication, including information relating to the location of the target 20 and the errors associated with the location, is coupled to a command and decision (C&D) unit 216. C&D unit 216 of the first ship 14 digitally processes the target location information from the second ship 22 in processor 14c, and from this location information determines the target azimuth and elevation angle relative to the first ship 14, as well as the azimuth and elevation extent of the search or acquisition face required to acquire the target with its own radar system.

The target azimuth and elevation relative to the first ship 14 of FIG. 2, as well as the azimuth and elevation extent of the acquisition face (see FIG. 3A) required by the errors in target azimuth and elevation, are transmitted from the C&D unit 216 of FIG. 2 to the first ship's radar beam control unit 218, which may also be part of computer 14c. Radar beam control unit 218 commands the generation of transmit and receive beams by antenna face 220. These beams are "pencil beams," or narrow beams, as are known in the art. A representative pencil beam is illustrated as 222.

The radar beam controller 218 of FIG. 2, together with the antenna face 220, produces sequential pencil beams in directions which, in conjunction with other pencil beams, search the volume of space defined by the combination of an acquisition face in conjunction with the desired range.

Figure 3A:
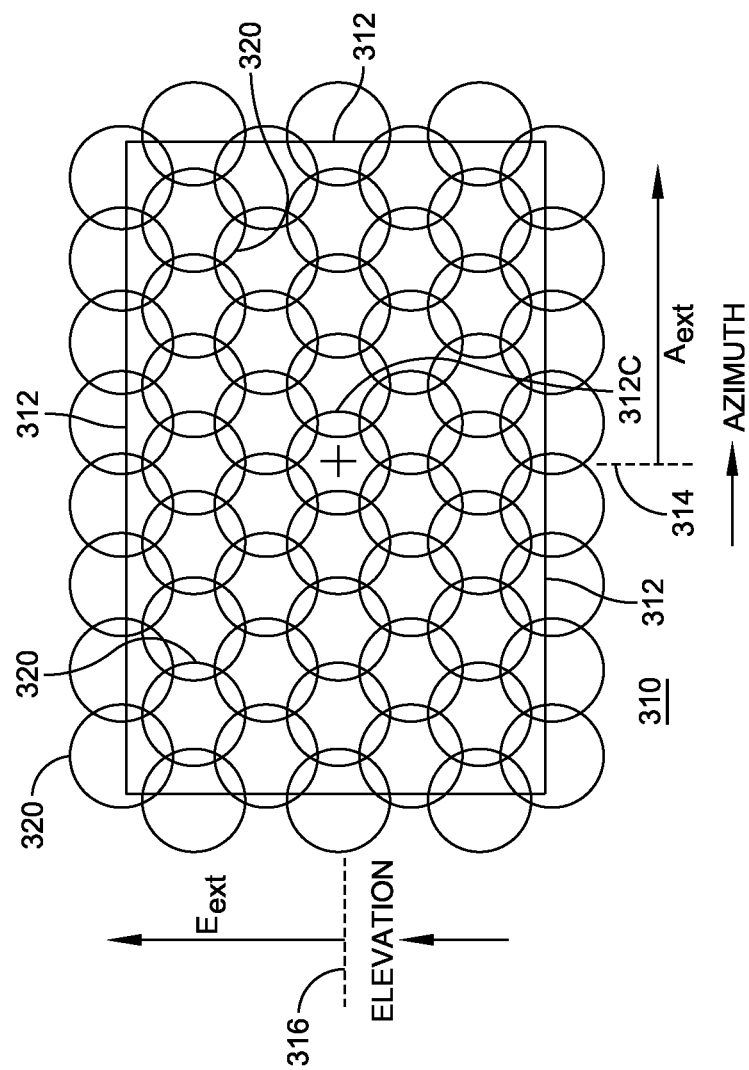
FIG. 3A is a view of an exemplary search face.

FIG. 3A is a representation of a search or acquisition face 310 defined by sequential beam generation by the radar system 16 of FIG. 2. The azimuth and elevation directions are indicated by arrows. In FIG. 3A, the nominal target azimuth and elevation, as specified by the target azimuth and elevation angle relative to the first ship 14 generated by C&D unit 216, appears as a + symbol at the center of the acquisition face 310. A "cross-section" of each pencil beam is illustrated as a circle. Representative circles are designated by reference number 320. The pencil beams are directed so that the beams overlap at a given power level. This overlap is indicated in FIG. 3A by the overlap of the circles. Those skilled in the art will understand that the "magnitude" of the overlap depends upon the "beamwidth" of the beams, the relative placement of the beam centers by the radar, and the attenuation or "signal" level at the overlap. Also shown in FIG. 3A, the overlapping beams provide coverage of a region defined by a rectangular outline 312. The azimuth "extent" of the coverage region is defined by the arrow designated $A_{ext}$, extending in the horizontal direction from a vertical centerline 314 to the outline 312. The elevation "extent" of the coverage region is defined by the arrow designated $E_{ext}$, extending in the elevation or vertical direction from a horizontal centerline 316 to the outline 312.

Due to errors in determining the exact location of the target, however, the target may not be found at the precise specified cue coordinates. In order to acquire and track the target with the first ship's radar, therefore, it is desirable to search a region or extent about the nominal target local coordinates. Thus, the search or acquisition face to be searched by the first radar to acquire target 20 is defined by the reported coordinates as converted to local (the first) coordinates, and further as affected by the reported errors accompanying the target coordinates.

Figure 3B:
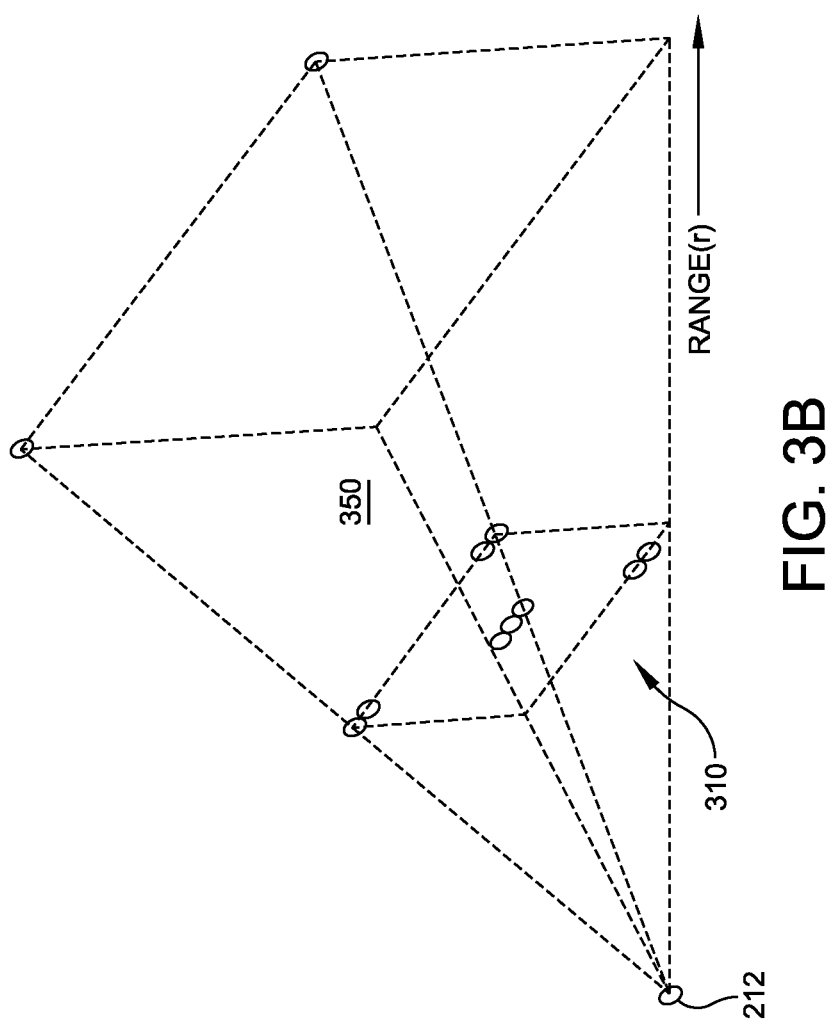
FIG. 3B is a representation of the relationship between an exemplary search face and the associated search volume.

The radar control represented by block 218 of FIG. 2 places an initial search beam designated 312C dead-center in the acquisition face, indicated in FIG. 3A by "+". Subsequent beams are placed to produce a regular pattern of partially overlapping beams that completely covers the acquisition face. The relationship of the search or acquisition face to the overall search volume associated with the face is illustrated in FIG. 3B. In FIG. 3B, the search face 310 in conjunction with range r, which provides a third dimension, defines a search volume 350.

As previously noted, the position errors in the radar observation of the target may be represented by a three-dimensional covariance, which is commonly represented by an ellipsoid. The target's nominal state vector and covariance, and the time at which these data are valid, can be passed to another radar or sensor system, which may perform a search of the indicated volume in order to obtain a local track for the target. This process is referred to as "cued acquisition." The search volume is created by transforming the data into the cued radar system's local coordinate frame, and transcribing the covariance about the nominal target position into the minimum displacements in range, azimuth, and elevation that enclose the covariance. The minimum displacements from the nominal position to the maximum elevation or azimuth are referred to as extents. The azimuth extent is typically first determined as a transverse extent in the range-transverse plane normal to the direction of increasing elevation at the nominal target position. Projection onto the East-North (EN) plane subsequently gives the desired azimuth extent.

Figure 3C:
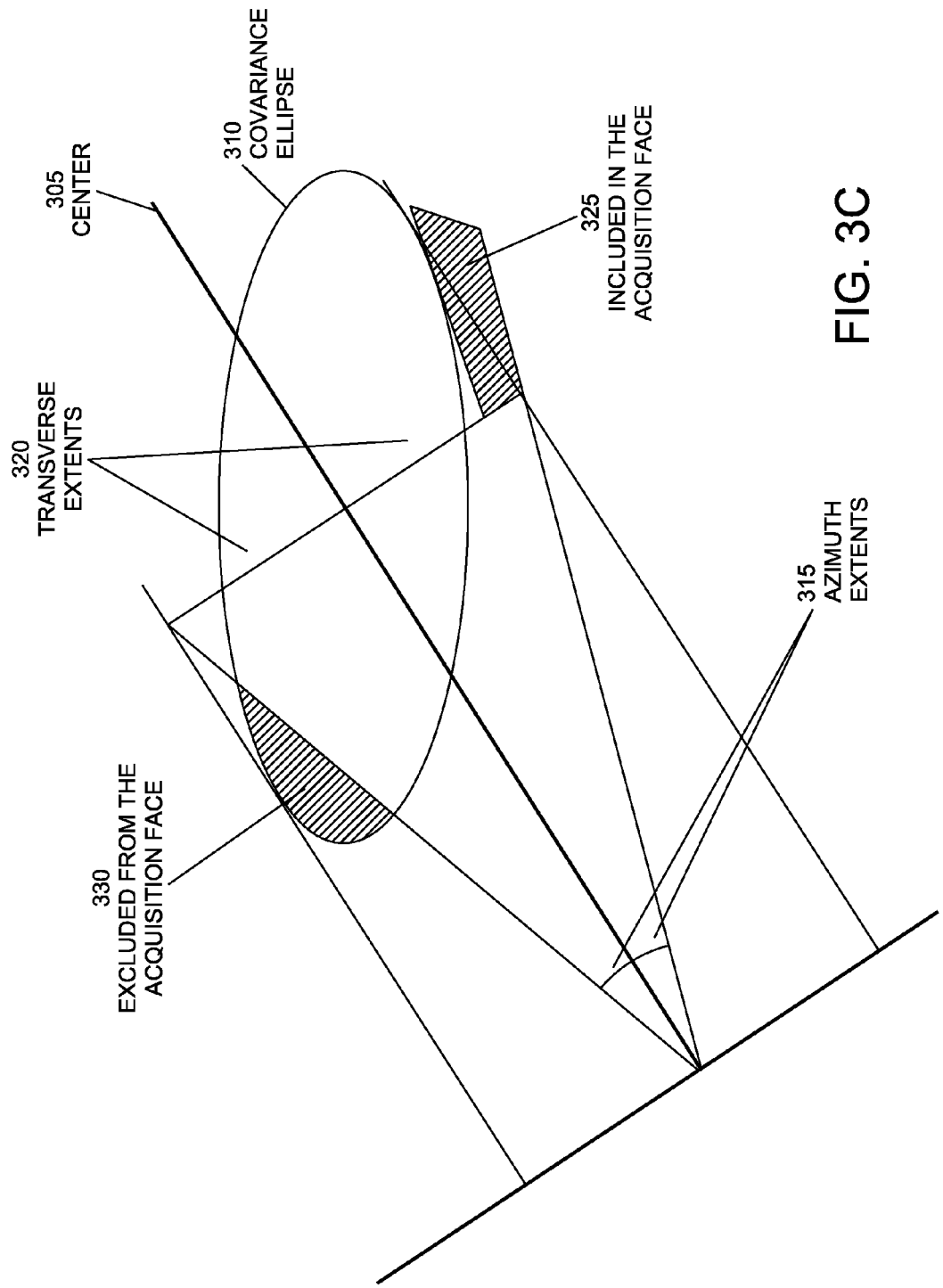
FIG. 3C is a representation of the relationship between a covariance ellipse and an acquisition face in the range azimuth plane after parallel projection.

As shown in FIG. 3C, parallel projection may result in the center 305 of the acquisition face being offset from a desirable position in which the nominal center of the covariance ellipsoid 310 is retained as the center of the acquisition face. As a result of this offset, azimuth extents 315 and transverse extents 320 define an acquisition face that excludes area 330, which is part of the covariance ellipsoid 310, but includes area 325, which is not part of covariance ellipsoid 310. Accordingly, it is desirable to recenter the acquisition face when performing perspective projection as described herein so that the acquisition face does not exclude portions of the covariance ellipsoid and include areas that are not part of the covariance ellipsoid.

Figure 3D:
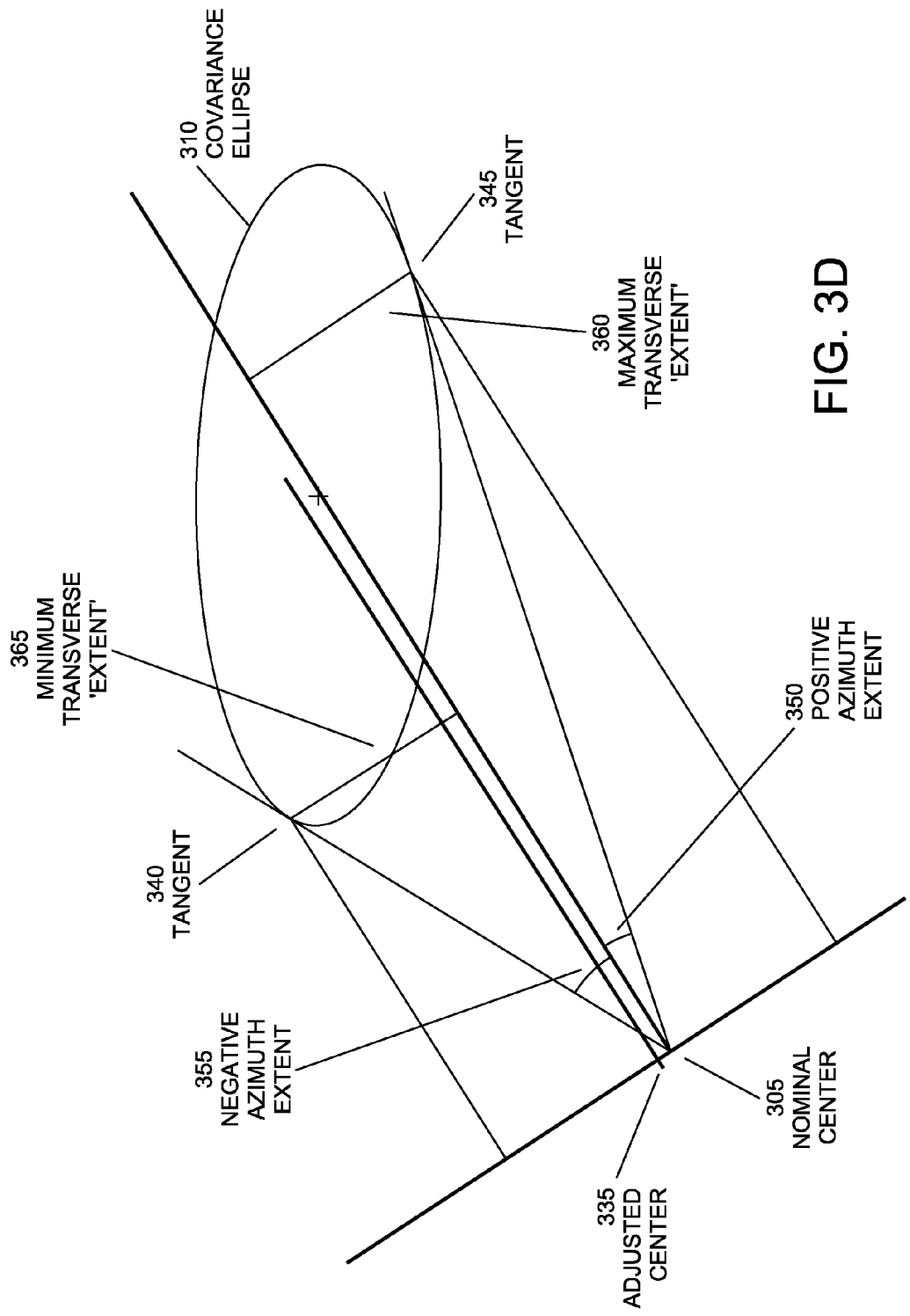
FIG. 3D is a representation of the relationship between a covariance ellipse and an acquisition face having an adjusted center in the range azimuth plane after perspective projection.

In accordance with the method of the present disclosure, the target's covariance ellipsoid is parallel projected onto the range-transverse and range-elevation planes to reduce the three-dimensional covariance ellipsoid to two dimensional ellipses. A perspective projection of the resulting covariance ellipses is then performed to determine the elevation and azimuth extents. In one embodiment, the perspective projection of the covariance ellipses is performed by using a generic tangent formula for a geometric figure, such as a conic section to the ellipse, and determining a point of tangency by simultaneously solving: a) an equation for a line containing a point of tangency and a coordinate origin and, b) the equation of the ellipse. The elevation and azimuth extents are determined by obtaining the inverse tangent of the ratio of the coordinates of the tangent. FIG. 3D shows an example of perspective projection of a covariance ellipse in the range-azimuth plane. FIG. 3D shows points of tangency 340 and 345, positive and negative azimuth extents 350 and 355, positive and negative transverse extents 360 and 365, and the adjusted center of the acquisition face 335. The following discussion details the method of determining the points of tangency, positive and negative azimuth and transverse extents, and the adjusted center of the acquisition face, which method is also applicable to perspective projection of covariance ellipses in the range-elevation plane.

A common approach to representing Gaussian error along each axis in Cartesian coordinates is to define an error (covariance) ellipsoid with the errors defining the principle axes. The error encompassed by the ellipsoid is invariant with respect to coordinate transformation, hence unitary rotations and uniform translations have no effect on its shape and size.

Parallel Projection onto the Plane:

The first step is to simplify the problem by parallel projection of the covariance ellipsoid onto the range-transverse or range-elevation plane. While reducing the number of dimensions, the approach does not introduce distortion or approximation. Given a 3×3 covariance C $$C = \begin{pmatrix} C_{11} & c_{12} & c_{13} \\ c_{21} & c_{22} & c_{23} \\ c_{31} & c_{32} & c_{33} \end{pmatrix} = \begin{pmatrix} c_1 & c_4 & c_6 \\ c_4 & c_2 & c_5 \\ c_6 & c_5 & c_3 \end{pmatrix}$$

defined in the range-elevation-transverse space of an observer, parallel projection onto, e.g., the range-transverse plane, yields a reduced (two-dimensional) covariance $C_{RT}$:

$$C_{RT,2\times2} = \begin{pmatrix} c_1 & c_4 \\ c_4 & c_2 \end{pmatrix}.$$

Tangent to a Point on an Ellipse Centered at $(0, r_0)$:

The equation for an error (covariance) ellipse corresponding to the reduced covariance $C_{RT}$ centered at $(0, r_0)$ (where $r_0$ is the distance along the range, or y, axis) is $$x^T C_{RT,2\times2}^{-1} x = x^T \frac{\begin{pmatrix} c_2 & -c_4 \\ -c_4 & c_1 \end{pmatrix}}{\|c_{RT,2\times2}\|} x = 1.$$

The determinant $\|C_{RT}\| = c_1 c_2 - c_4^2$ and $$x = \begin{pmatrix} x \\ y - r_0 \end{pmatrix}.$$

where the vector x is initially an arbitrary vector in range-transverse space, x is the transverse direction (or elevation direction in range-elevation space), and y is the range direction.

The resulting equation is:

$$c_2 x^2 - 2c_4 x(y-r_0) + c_1(y-r_0)^2 = \|C_{RT}\| \quad (1)$$

The tangent at a specific point $(x_0, y_0)$ is:

$$c_2 x_0 x - c_4 x_0 (y-r_0) - c_4 x(y_0-r_0) + c_1(y_0-r_0)(y-r_0) = \|C_{RT}\|.$$

For example, if the $c_4$ terms are zero the error ellipse is co-oriented with the reference coordinate frame, has semi-major and semi-minor axes lengths of $\sqrt{c_1}$ and $\sqrt{c_2}$ respectively, and a tangent at the point $(0, y_0 = \sqrt{c_2} + r_0)$ is $y = \sqrt{c_2} + r_0$.

Two points of tangency are found, in which the tangent line includes the coordinate origin, and hence are the points where b in y=ax+b is zero. The constraint b=0 establishes one of the necessary relations between $x_0$ and $y_0$:

$$y_0 - r_0 = \frac{c_4}{c_1}x_0 - \frac{\|C_{RT}\|}{r_0 c_1}$$

Since $x_0$ and $y_0$ lie on the ellipse, the solution of the ellipse equation (1), with the indicated substitution gives the two points of tangency that solve the problem:

$$c_2 x_0^2 - 2c_4 x_0 (y_0 - r_0) + c_1 (y_0 - r_0)^2 =$$

$$\|C_{RT}\| \rightarrow x_0 = \pm \frac{1}{r_0}\sqrt{c_1 r_0^2 - \|C_{RT}\|}$$

Note that the $x_o$ solutions are equal in magnitude and opposite in sign results from the symmetry of the geometric figure. The solutions for $y_0$ are then just:

$$y_0 = r_0 + \frac{1}{c_1 r_0}\left[\pm c_4 \sqrt{c_1 r_0^2 - \|C_{RT}\|} - \|C_{RT}\|\right]$$

The angles of interest (here written for transverse extents $\Delta T$) are given by:

$$\Delta T = \tan^{-1}\left[\frac{\pm\sqrt{c_1 r_0^2 - \|C_{RT}\|}}{r_0^2 + \frac{1}{c_1}\left[\pm c_4\sqrt{c_1 r_0^2 - \|C_{RT}\|} - \|C_{RT}\|\right]}\right] \quad (2)$$

with '+' corresponding to the clockwise increasing transverse extent, and the azimuth extent increasing clockwise from North after projection onto the EN plane.

The elevation extents can be determined by applying the above procedure to a two-dimensional covariance projected onto the range-elevation plane. For example, assume a covariance projected onto the range-elevation plane, and aligned so that $c_1 = b^2$ corresponds to range, and $c_2 = a^2$ to elevation so that $c_4 = 0$. Then the maximum elevation extent reduces to the inverse tangent of the ratio of coordinates:

$$\Delta E = \tan^{-1}\left[\frac{a}{\sqrt{r_0^2 - b^2}}\right].$$

In this case $x_0$ is less than a but approaches a as $r_0 \rightarrow \infty$, while $\Delta E \rightarrow 0$. Similarly in the limit as $r_0 \rightarrow b$, the value of $x_0 \rightarrow 0$ while $\Delta E \rightarrow \pi/2$.

Following the procedure leading to equation (2) above but using the reduced covariance $C_{RE}$ resulting from the parallel projection onto the range-elevation plane:

$$C_{RE} = \begin{pmatrix} c_1 & c_6 \\ c_6 & c_3 \end{pmatrix}$$

results in a similar expression for the two elevation extents:

$$\Delta E_{\pm} = \tan^{-1}\left[\frac{\pm\sqrt{c_1 r_0^2 - \|C_{RE}\|}}{r_0^2 + \frac{1}{c_1}\left[\pm c_6 \sqrt{c_1 r_0^2 - \|C_{RE}\|} - \|C_{RE}\|\right]}\right].$$

Only a single extent in each direction is sent to the radar. The azimuth extent is determined from averaging two transverse extents: $A_{ext} = (\Delta T_+ - \Delta T_-)/2$. The elevation extent is similarly determined by averaging two elevation extents: $E = (\Delta E_+ - \Delta E_-)/2$. The elevation and azimuth centers of the acquisition face are then recalculated from an estimated nominal azimuth and elevation of the target $A_0$ and $E_0$ respectively (which may have been received from a remote radar system), to be $$E_{center} = E_0 + \frac{1}{2}(\Delta E_+ + \Delta E_-)$$

$$A_{center} = A_0 + \frac{1}{2}(\Delta T_+ + \Delta T_-).$$

The elevation extents and centers, the azimuth extents and centers, and other acquisition parameters (discussed below referencing FIG. 5) are sent to the radar system which searches the volume.

Figure 4:
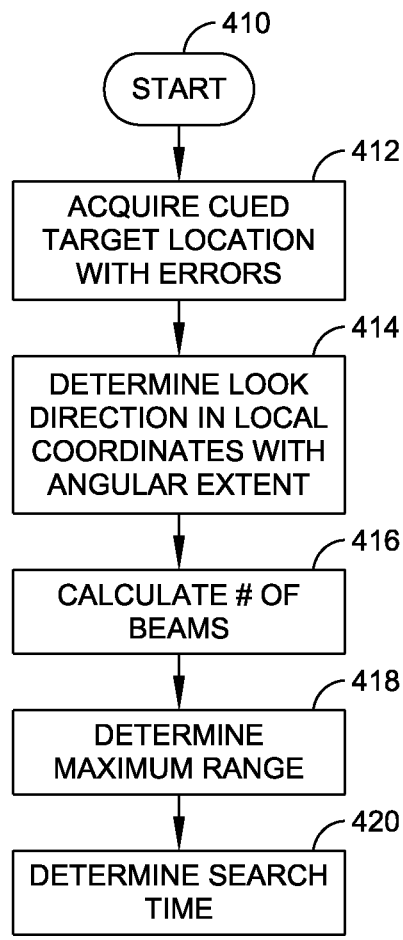
FIG. 4 is a flowchart illustrating steps according to an embodiment of the invention.

FIG. 4 is a flow chart illustrating steps according to a generalized search evolution. The steps begin at block 410, and flow to block 412, which represents acquisition of cued target information, together with error information. This may be accomplished as described in relation to FIG. 1. From block 412 of FIG. 4, the logic flows to block 414, which represents determination from the cue information of the location of the target 20 relative to the first ship 14, and calculation of the azimuth and elevation extent of the acquisition face. Block 416 represents the calculation of the number of beams required to fill the acquisition face, as well as the time required to accomplish the search, taking into account the number of beams and the range. The range of the search volume is determined in block 418 in order to estimate search time per beam, as is known in the art. The C& D unit 216 of FIG. 2 multiplies the range-dependent time with (or by) the number of beams, as suggested by block 420 of FIG. 4, and arrives at a scan or search time for the number of beams associated with the acquisition face.

Figure 5:
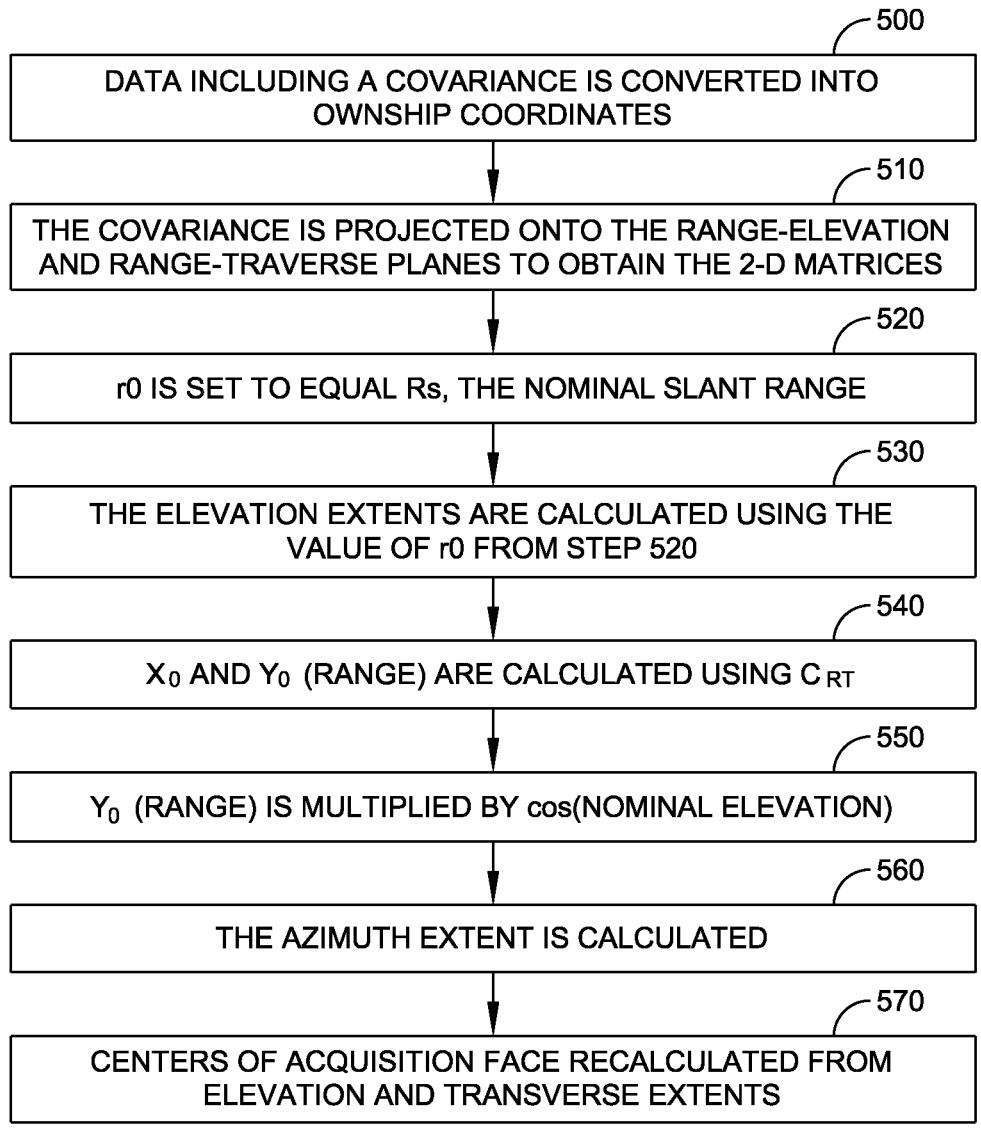
FIG. 5 is a flowchart illustrating the steps for perspective projection of the acquisition face of a search volume.

FIG. 5 is a flowchart of the method described above for obtaining azimuth and elevation extents for cued acquisition volumes. At step 500, data including a three-dimensional covariance is converted into ownship coordinates. At step 510, the covariance is projected onto the range-elevation and range-transverse planes to obtain the 2-d matrices or covariances $C_{re}$ and $C_{rt}$ e.g. as described above. At step 520, $r_0$ is set equal to $R_s$, the nominal slant range, where the slant range is the linear distance from a sensor to a point of interest such as a target. At step 530, with the value of $r_0$ from step 520, the elevation extents are calculated using the reduced covariance $C_{re}$ and equation (2). At step 540, $x_0$ and $y_0$ are calculated using the reduced covariance $C_{rt}$. At step 550, $y_0$ (range) is multiplied by cos(nominal elevation). At step 560, the azimuth extent is calculated using equation (2).

At step 570 the two elevations and two transverse extents are averaged and the centers of the acquisition face are recalculated.

The disclosed method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1-6 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, any of the functions and steps provided in FIGS. 5 and 6 may be implemented in hardware, software or a combination of both and may reside on one or more processing devices located at any location of a network linking the elements of FIG. 1 or another linked network, including the Internet.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for generating a radar search volume enclosing a tracked target, the method comprising:
    parallel projecting a three-dimensional covariance of the tracked target onto a range-transverse plane and a range-elevation plane to obtain two-dimensional covariances;
    determining, by a command and decision processor, an average elevation extent and average azimuth extent by perspective projecting the two-dimensional covariances;
    and
    generating the search volume using the average elevation extent and the average azimuth extent.

2. The method according to claim 1, wherein determining the average elevation extent and the average azimuth extent by perspective projecting the two-dimensional covariances comprises:
    generating, by the command and decision processor, an error ellipse
    corresponding to each of the two-dimensional covariances;
    determining, by the command and decision processor, a point of tangency on each of the error ellipses;
    determining, by the command and decision processor, maximum elevation and transverse extents of the search volume using the points of tangency; and
    determining, by the command and decision processor, an average elevation extent and an average azimuth extent from the maximum elevation and transverse extents.

3. The method according to claim 2, wherein determining, by the command and decision processor, the point of tangency on each of the error ellipses comprises using a tangent formula for a geometric figure and simultaneously solving, for each error ellipse, an equation for a line containing the point of tangency and a coordinate origin, and an equation for the error ellipse containing the point of tangency.

4. The method according to claim 2, wherein determining, by the command and decision processor, the maximum elevation and transverse extents of the search volume from the points of tangency comprises determining the maximum elevation and transverse extents of the search volume using the inverse tangent of a ratio of the coordinates of the points of tangency.

5. The method according to claim 1, further comprising receiving, by a communications unit, tracking data relating to the tracked target from a remote radar system.

6. The method according to claim 5, wherein the tracking data received by the communications unit from the remote radar system is transformed into coordinates of a local radar system generating the radar search volume, prior to parallel projecting of the three-dimensional covariance of the tracked target.

7. The method according to claim 1, further comprising determining, by the command and decision processor, an elevation center for an acquisition face of the search volume based on the average elevation extent and a nominal elevation of the target and determining an azimuth center for the acquisition face of the search volume based on the average azimuth extent and a nominal azimuth of the target.

8. A radar system for generating a radar search volume enclosing a tracked target, the radar system comprising:
    a command and decision unit configured to:
        parallel project a three-dimensional covariance of the tracked target onto a range-transverse plane and a range-elevation plane to obtain two-dimensional covariances;
        determine an average elevation extent and average azimuth extent by perspective projecting the two-dimensional covariances;
        and
    a radar beam controller configured to generate the search volume using the average elevation extent and the average azimuth extent.

9. The radar system of claim 8, wherein the command and decision unit being configured to determine the average elevation extent and the average azimuth extent by perspective projecting the two-dimensional covariances comprises the command and decision unit being configured to:
    generate an error ellipse corresponding to each of the two-dimensional covariances;
    determine a point of tangency on each of the error ellipses;
    determine maximum elevation and transverse extents of a search volume using the points of tangency; and
    determine an average elevation extent and an average azimuth extent from the maximum elevation and transverse extents.

10. The radar system of claim 9, wherein the command and decision unit being configured to determine the maximum elevation and transverse extents of the search volume using the points of tangency comprises the command and decision unit being configured to determine the maximum elevation and transverse extents of the search volume using the inverse tangent of a ratio of the coordinates of the points of tangency.

11. The radar system according to claim 9, wherein the command and decision unit being configured to determine the point of tangency on each of the error ellipses comprises the command and decision unit being configured to use a tangent formula for a geometric figure and simultaneously solve, for each error ellipse, an equation for a line containing the point of tangency and a coordinate origin, and an equation for the error ellipse containing the point of tangency.

12. The radar system according to claim 8, further comprising a communications unit configured to receive tracking data relating to the tracked target from a remote radar system.

13. The method according to claim 12, further comprising transforming, by the command and decision unit, the tracking data received from the remote radar system into coordinates of the radar system, prior to parallel projecting of the three-dimensional covariance of the tracked target.

14. The method according to claim 1, further comprising determining, by the command and decision unit, an elevation center for an acquisition face of the search volume based on the average elevation extent and a nominal elevation of the target and determining, by the command and decision unit, an azimuth center for the acquisition face of the search volume based on the average azimuth extent and a nominal azimuth of the target.

\* \* \* \* \*